May 24, 1966
D. L. KITCHEN
3,252,550
SIMULTANEOUS PEDAL OPERATED CLUTCH AND MANUALLY
OPERATED TRANSMISSION
Filed May 13, 1964
2 Sheets-Sheet 2
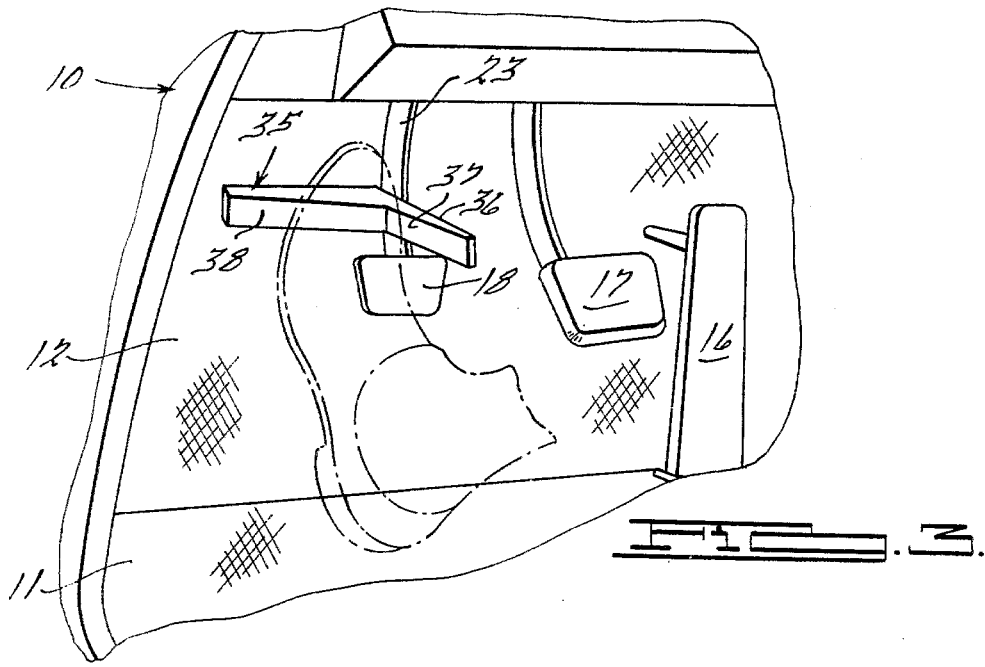
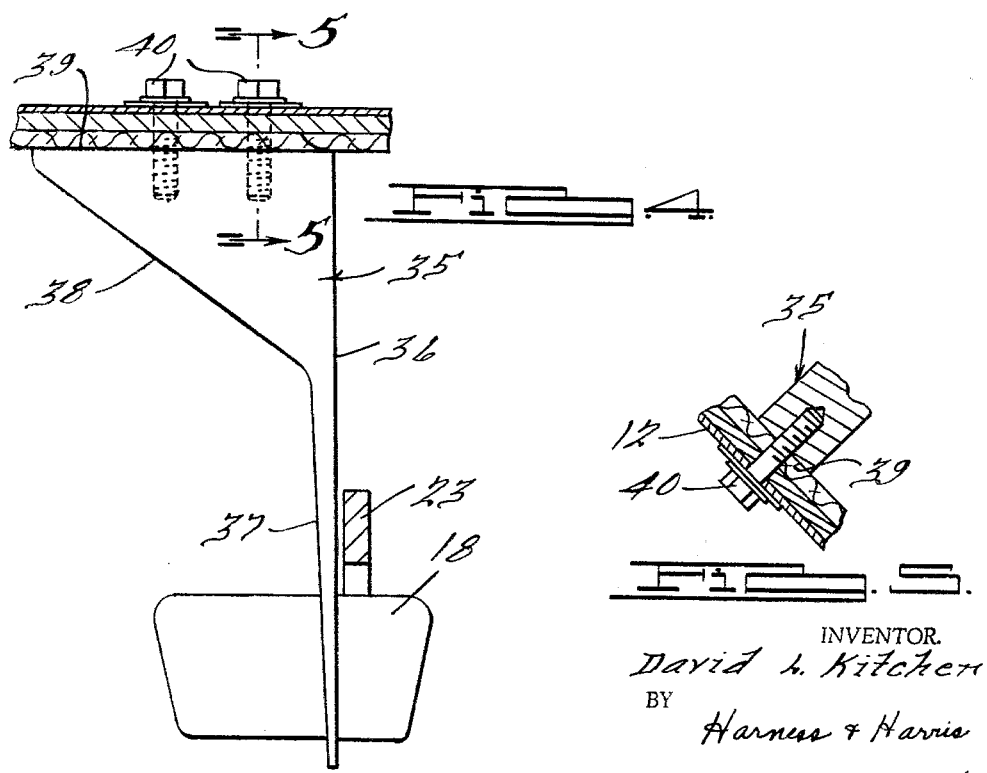
INVENTOR.
David L. Kitchen
BY
Harness & Harris
ATTORNEYS.

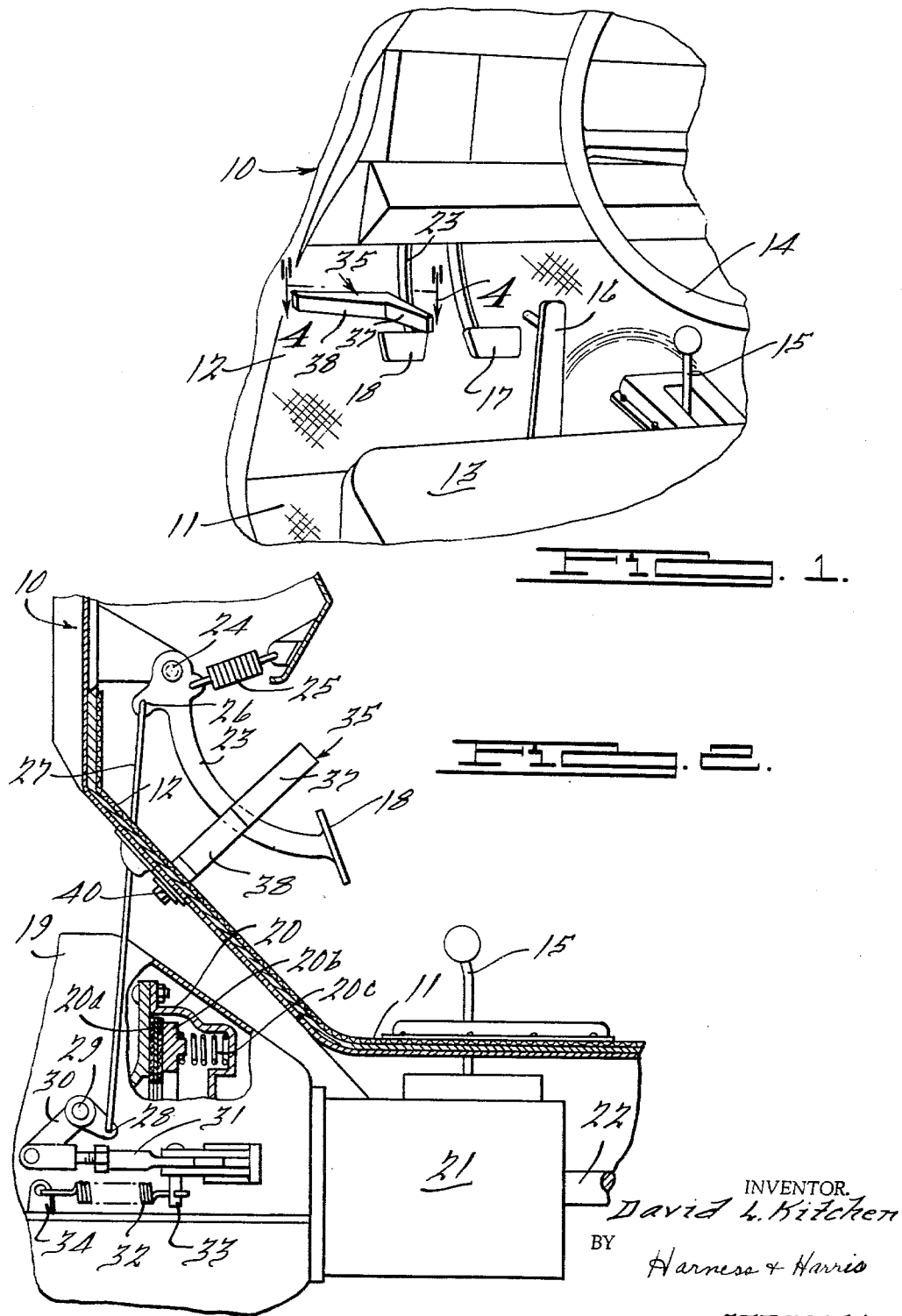

United States Patent Office 3,252,550
Patented May 24, 1966

3,252,550
SIMULTANEOUS PEDAL OPERATED CLUTCH AND MANUALLY OPERATED TRANSMISSION
David L. Kitchen, Utica, Mich., assignor to Chrysler Corporation, Highland Park, Mich., a corporation of Delaware
Filed May 13, 1964, Ser. No. 367,171
7 Claims. (Cl. 192—3.5)

This invention relates to automobiles of the type having a pedal operated clutch and a manually operated transmission and in particular to an improved means and method for coordinating the actuation of the clutch and transmission to facilitate and expedite changing of the transmission gear ratio for racing purposes.

A highly competitive sport known as "drag racing" involves the acceleration of an automobile from a dead start to a maximum speed in a minimum of time over a limited distance, as for example a quarter-mile straightaway. The vehicle in such a contest usually employs a multiple speed transmission which is shifted from a low speed ratio for starting through successively higher speed ratios at precisely timed intervals in order to obtain optimum acceleration throughout the limited travel distance available. The performance of the automobile depends in a large part on the skill of the driver. Some drivers develop phenomenal ability for split second timing which enables a transmission gear change or "shift" with only a slight loss in acceleration.

In accordance with customary practice, when it is necessary to shift or change gears, the driver must coordinate three operations in the following order; namely, depression of the foot operated clutch pedal to disengage the engine from the drive train, manual shifting of the transmission control lever, then release of the clutch pedal to re-engage the engine with the drive train. The three operations require only a fraction of a second. In an effort to save a small fraction of a second from the total time required, the driver sometimes does not depress the clutch pedal far enough, or releases it too soon—before the clutch adequately disengages the engine from the transmission—whereby the second operation of shifting the transmission control lever cannot be accomplished. As a result the driver will be hopelessly out of the contest. On the other hand, in order to be sure that the engine is completely disengaged before attempting to change gears, the driver sometimes holds the clutch pedal fully depressed a small fraction of a second longer than necessary, in which case critical time is lost. Although the times involved are measured in tenths and hundredths of seconds, slight differences in driver skill and experience often means the difference between winning and losing a race.

An object of the present invention is to provide improved and simple means in an automobile for assuring the driver that the clutch pedal will be fully depressed during each gear shift and for eliminating the need for driver discretion in timing the release of the clutch pedal, thereby to enable a moderately skilled driver to compete on equal terms with a more skilled driver.

Another and more specific object is to provide a fixed cam adapted to be mounted adjacent the path of travel of the clutch release pedal and arranged to engage the driver's foot and displace the latter from the clutch pedal when that pedal has traveled a predetermined distance adequate to allow manual shifting of the transmission gear from one speed ratio to another.

Another object is to provide a new concept and method in high speed gear shifting suitable for use in "drag racing."

Other objects of this invention will appear in the following description and appended claims, reference being had to the accompanying drawings forming a part of this specification wherein like reference characters designate corresponding parts in the several views.

FIGURE 1 is a fragmentary perspective view showing the interior of an automobile at the region of the clutch and brake pedals.

FIGURE 2 is a longitudinal sectional view through the portion of the automobile shown in FIGURE 1, schematically illustrating the clutch operating mechanism.

FIGURE 3 is an enlarged view similar to FIGURE 1, showing the operator's foot in phantom in the operation of depressing the clutch pedal to release the clutch mechanism.

FIGURE 4 is a fragmentary enlarged sectional view taken in the direction of the arrows substantially along the line 4—4 of FIGURE 1.

FIGURE 5 is a fragmentary sectional view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in an automobile body 10 having the usual floor board 11 and fire wall 12, driver seat 13, steering wheel 14, manual transmission gear shift lever 15, foot actuated throttle or gas pedal 16, brake pedal 17 and clutch pedal 18. The above enumerated elements may be conventional in structure and operation and are accordingly not described in further detail. The vehicle also includes an engine 19 suitably mounted within the body 10 and connected by means of a clutch 20 and a multiple position transmission 21 with the drive shaft 22 to drive the rear wheels of the automobile in accordance with conventional practice.

By manual actuation of the transmission shift lever 15, gears within the transmission 21 are shifted into various predetermined relationships to obtain different speed ratios between the engine 19 and driveshaft 22. Usually, in order to effect a gear change in the transmission 21, it is first necessary to disengage the latter from the engine 19 by releasing the clutch 20. This is accomplished by depressing the clutch pedal 18 toward the wall 12, forward or leftward in FIGURE 2. The pedal 18 is integral with an arm 23 pivoted at 24 on a fixed portion of the body 10. A pedal return spring 25 connected to the arm 23 at a point intermediate the pivot 24 and pedal 18, and also connected to a fixed portion of the body 10, is under tension yieldingly urging the pedal 18 rearward to a clutch engaging position.

A crank arm 26 of the arm 23 is pivotally connected to the upper end of a rod 27 having its lower end pivotally connected to one arm 28 of a bell crank suitably pivoted at 29 on the housing of engine 19. A second arm 30 of the bell crank is pivotally connected to the left end of a longitudinally adjustable clutch actuating link 31 which is suitably connected with the clutch mechanism 20 to actuate the latter to disengage the driving connection between the engine 19 and transmission 21 upon rightward movement of link 31. The clutch 20 is illustrated schematically and includes clutch plates 20a and 20b normally urged into frictional engagement with each other by spring 20c to establish a driving-driven relationship therebetween. The plates 20a and 20b are engaged with the engine 19 and transmission 21 respectively and disengaged the transmission from the engine when the plates are separated by rightward movement of link 31.

It is apparent from the foregoing that when the pedal 18 is depressed toward the wall 12, against the tension of spring 25, rod 27 is elevated and bell crank 28, 30 is pivoted counter clockwise to shift link 31 rightward and separate the clutch plates 20a and 20b. A clutch release spring 32 is connected under tension at 33 to the link 31 and at 34 to a fixed portion of the housing of engine 19 to urge the link 31 leftward and cooperate with spring 20c to urge the clutch plates into their frictional engagement with each other. The foregoing structure may also be conventional and is accordingly not described in further detail.

In order to assure immediate release of the clutch pedal 18 from the foot of the operator when the pedal 18 is depressed a predetermined distance toward the wall 12 sufficient to move clutch 20 to its disengaged position, a foot controlled cam 35 is mounted on the wall 12 adjacent the left side of arm 23, FIGURE 4. The cam 35 is provided with a right edge 36 immediately adjacent and parallel to the path of travel of the arm 23. A cam surface 37 of the cam 35 extends rearwardly beyond the limit of rearward movement of the pedal 18 and is arranged to engage the inner surface of the left foot of the automobile driver when that foot is placed on pedal 18 to actuate the same. The cam surface 37 diverges slightly from the path of travel of the arm 23 and merges at its forward end with a sharply diverging surface 38 of the cam 35, which also engages the inner side of the left foot to cam the latter out of engagement with the pedal 18 when the latter is depressed the aforesaid determined distance by the foot. A forward portion of the cam 35 comprises a footing 39 which is rigidly secured to the wall 12 by bolts 40.

The conventional clutch pedal 18 comprises a metal plate covered with a removable rubber pad which increases the foot engaging surface and coefficient of friction of the pedal during normal operation. A similar rubber pad is illustrated in position on the brake pedal 17. When the rubber pad is removed from the pedal 18, the reduced surface area and reduced coefficient of friction renders it impossible for the driver to depress his foot to the wall 12 and hold the clutch pedal 18 at the clutch disengaging position. Accordingly in a drag race, the driver is free to slam the pedal 18 toward the wall 12 with his foot as rapidly as possible without giving any thought whatever to synchronizing the release of the clutch pedal 18 with operation of the gear shift lever 15. The driver's attention may thus be concentrated solely on the problems of depressing the clutch pedal 18 at the proper engine speed in synchronism with shifting of the transmission control lever 15. Shifting of the latter lever must be timed to coincide with movement of the clutch pedal 18 to its forward clutch disengaging position, preferably at or just before the limit of forward movement of the clutch pedal 18, because the clutch pedal 18 will immediately be returned to its rearward clutch engaging position by the springs 20c, 25 and 32 when the operator's foot is cammed out of engagement with the foot pedal by the operation of the cam 35 as described above.

Ordinarily in a gear shift operation, the driver will exert pressure on the lever 15 in the direction of the intended shift. Consequently, as soon as the clutch is disengaged by the operation of pedal 18, the lever 15 and transmission 21 will be shifted to the new speed ratio position. No time will be lost by conscious holding and releasing of the pedal 18 as a result of effort on the part of the driver, because the clutch will be returned automatically to its engaged position by springs 20c, 25 and 32 almost immediately after its disengagement.

When it is desired to drive the automobile to and from the drag strip and to shift the gears of the transmission 21 in a conventional manner, the customary rubber pad for the pedal 18 may be affixed, whereby the increased surface area and friction will enable the driver with a minimum of practice to depress the pedal 18 until his foot engages cam surface 38. At this position of the clutch pedal 18, the plates of the clutch 20 will be sufficiently disengaged from each other to enable a gear shift if the engine speed is not too great.

The foregoing consideration of the rubber pedal pad is mentioned merely in passing. The clutch pedal 18 is preferably employed in the present instance without such a pad, and also preferably the driver will wear leather soled shoes to enhance the cam action. However, the length and angle of cam surface 38 can be adapted to cam the driver's foot from the pedal 18 regardless whether the rubber pedal pad is employed or not. In such a situation, "normal" slow speed shifting can be accomplished by the driver if he places his foot on the pedal 18 at the right edge of cam 35.

It is also to be noted in regard to the foregoing that the clutch will be partially disengaged sufficiently to enable high speed shifting when the pedal 18 is depressed only approximately two-thirds of its limit of movement. Thus skilled drivers, without recourse to the cam 35, attempt to save time during a drag race by partially declutching the engine, then releasing clutch pedal after the gear shift. However, by the time the driver's nerve impulses "signal" for a release of the clutch pedal, time is lost.

Experience with applicant's cam 35 has proved that the driver can save time in shifting by slamming the pedal 18 to its limit of travel and relying on the cam 35 to disengage his foot from the pedal 18 at the proper declutching position. By depressing the pedal 18 to or approximately to its limit of travel and then relying on the springs 20c, 25 and 32 to return the clutch mechanism to the engaged position, the clutch plates 20a, 20b will be completely disengaged for sufficient time to enable shifting of the transmission 21 positively and in a minimum of time if the lever 15 is manually preloaded with force in the direction of the intended shift.

Inasmuch as the clutch 20 must be disengaged a small but measurable time interval to enable shifting of the transmission 21, the act of slamming the pedal 18 to approximately its limit of travel before the driver's foot is cammed off the pedal 18—i.e. of rapidly moving the latter beyond the minimum distance required for shifting of transmission 21, and then automatically returning the clutch mechanism to its fully engaged position by means of the various clutch return spring—an adequate declutching time to enable gear shifting will result with a minimum of lost time.

I claim:

1. In an automobile, clutch means including a clutch adapted to be selectively operated to complete a driving connection between the automobile engine and its driving wheels, resilient means normally urging said clutch to an operating condition to complete said driving connection, said clutch means also including a personally actuated clutch operating member adapted to be shifted by the driver of said automobile to a de-clutching position and being engageable with said clutch to shift the latter from said operating condition when said member is shifted to said de-clutching position, and means for automatically releasing said clutch from the control of said driver upon shifting of said member to said de-clutching position.

2. In an automobile having an engine and driving wheels, clutch means, resilient means normally urging said clutch means to an operating condition, said clutch means including a clutch shiftable to said operating condition to connect said engine and wheels and also including a personally actuated clutch operating member shiftable by the driver of said automobile from said operating condition to a de-clutching position to shift said clutch from said operating condition, and means to enable automatic return of said clutch to said operating condition including cam means for automatically releasing said clutch from the control of said driver upon shifting of said member to said de-clutching position.

3. In the combination according to claim 2, said member comprising a pedal adapted to be depressed to said declutching position by the foot of said driver, and said cam means comprising a fixed cam adjacent and inclined to the direction of movement of said pedal and adapted to be engaged by said foot to cam the same from said pedal when the latter has been depressed a predetermined distance by said foot.

4. In an automobile, a personally operable clutch member shiftable by a portion of the body of the driver of said automobile from an operating condition to a declutching position, resilient means urging said member to said operating condition, and means to enable automatic return of said member to said operating condition including cam means adapted to be engaged by said portion of the body of said driver upon shifting of said member to said declutching position to cam said portion away from said member.

5. In the combination according to claim 4, said member comprising a pedal adapted to be depressed to said declutching position by the foot of said driver, and said cam means having a fixed cam surface inclined to the path of movement of said pedal and adapted to be engaged by said foot to cam the same from said pedal when the latter has been depressed a predetermined distance by said foot.

6. In a method for shifting the gears of an automobile transmission wherein a manually actuated transmission gear shift lever is actuated by the automobile driver in timed relation to the actuation by the foot of said driver of a clutch operating pedal adapted to be depressed a predetermined distance to a declutching position to disengage the automobile engine from the transmission and to be spring returned rapidly from its declutching condition to engage the engine with said transmission, the steps of arranging a cam with respect to said automobile in the path of travel of said foot to engage and cam said foot out of engagement with said pedal when the latter has been depressed to said declutching position by said foot, applying pressure to said gear shift lever tending to effect a shift of the same in a desired direction and simultaneously depressing said pedal with said foot so as to to engage said cam by said foot and cam the latter out of engagement with said pedal when said pedal has been depressed to said declutching position, said pressure being adequate to effect said shift when said clutch pedal has been depressed to said declutching position.

7. In a method for shifting the gears of an automobile transmission wherein a manually actuated transmission gear shift lever is actuated by the automobile driver in timed relation to the actuation by the foot of said driver of a clutch operating pedal adapted to progressively disengage the automobile engine from the transmission as said pedal is progressively depressed from a clutch engaged position to approximately its limit of travel and to be spring returned to its clutch engaged position to engage the engine with said transmission, the steps of applying sufficient pressure to said gear shift lever to effect said shifting of the gears of said transmission when said clutch pedal has been depressed a predetermined distance, simultaneously depressing said pedal with said foot, and camming said foot out of engagement with said pedal when said pedal has been depressed to approximately said limit of travel.

References Cited by the Examiner
UNITED STATES PATENTS 1,246,634   11/1917   Martino.
1,847,096   3/1932   Mossinghoff.

DAVID J. WILLIAMOWSKY, *Primary Examiner.*

DON A. WAITE, *Examiner.*

A. T. McKEON, *Assistant Examiner.*